Dec. 22, 1959     F. R. MOORE     2,918,207

TURBOCHARGER

Filed Dec. 16, 1957

INVENTOR.
Francis R. Moore
BY
S. C. Thorpe
ATTORNEY

United States Patent Office 2,918,207
Patented Dec. 22, 1959

2,918,207

TURBOCHARGER

Francis R. Moore, Birmingham, Mich., assignor to General Motors Corporation, Detroit, Mich., a corporation of Delaware Application December 16, 1957, Serial No. 703,085

5 Claims. (Cl. 230—116)

This invention relates to turbochargers for internal combustion engines and the like, and particularly to improvements in the mounting of the turbine nozzle and the shielding of the compressor and bearings from the heat of the turbine.

It has previously been proposed in turbochargers having the turbine and compressor "close coupled" with radial flow impellers on a common shaft to shield the compressor section and shaft bearings between the two rotors from the heat radiated from the higher temperature turbine. Such turbochargers conventionally employ a nozzle ring about the entrance to the turbine rotor, and due to the high temperatures of the exhaust gas flowing through this nozzle ring its thermal expansion relative to the turbine housing must be provided for. Such relative expansion poses problems in properly selecting and holding dimensional tolerances between the various parts, however, this has been overcome in a novel manner by my invention through the use of the aforementioned shield to resiliently clamp the nozzle in place.

The means for carrying out the invention will be better understood from the following description, having reference to the drawing, wherein.

Figure 1:
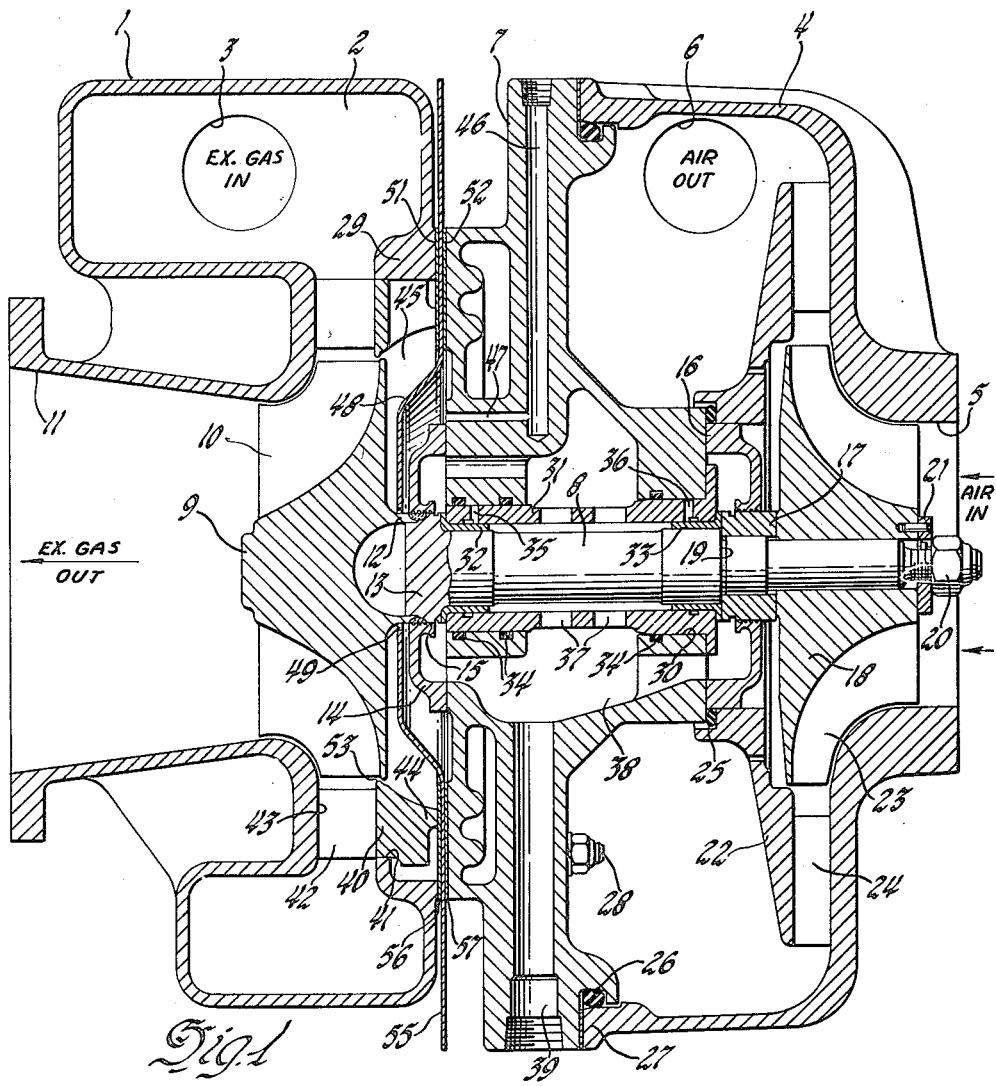
Figure 1 is a transverse longitudinal section through a turbocharger constructed in accordance with the invention.

Referring in detail to the drawing, the turbine section is shown in the left portion of Figure 1, and the supercharger or compressor in the right portion. 1 indicates the turbine housing which defines an outer annular chamber 2 having an inlet 3 for exhaust gases to enter from an internal combustion engine (not shown). 4 denotes the compressor housing having an axial air inlet 5 and a tangential air outlet 6 to the engine intake manifold or air box (not shown). Between the two housings is a rigid member 7 in the form of an intermediate housing or casing which supports journaling means for the shaft 8. Fixed to the left end of the shaft is the turbine rotor 9 having radially and axially disposed blades 10 through which the exhaust gases leave in an axial direction to flow out the central outlet 11 formed by the turbine housing. The shaft end of the turbine hub section is hollowed out to leave a relatively thin heat dam section 12 shown brazed to the shaft and flange 13. Rotatably fitting the periphery of this flange 13 is a sealing ring 14 whose inner periphery is provided with a helical groove 15 for preventing exhaust gas leakage toward the casing 7 from the turbine rotor. This sealing ring 14 may be secured at its outer extremities by studs (not shown) to the casing 7.

A similar sealing ring 16 with helically grooved inner periphery rotatably fitting a shaft carried bushing 17 is fixed to the opposite end face of the casing 7 as by studs (not shown) and serves to prevent air leakage toward the casing 7 from the compressor rotor 18. The bushing 17 is pressed on the shaft 8 against a shoulder 19 and serves as a spacer between the latter and the compressor rotor 18. The latter end of the shaft is threaded and carries a nut 20 which clamps a washer 21 to the rotor 18, this washer being keyed to the shaft and doweled to the rotor 18 as shown. 22 denotes a diffuser ring through which the air leaving the radially and axially disposed compressor blades 23 passes into the receiving chamber formed by the compressor housing 4 and the adjacent surfaces of the casing 7, from which chamber the air exits via the outlet 6. The vanes 24 of this diffuser ring abut the inner radial wall surface of the compressor housing, being clamped thereagainst as by a resilient O-ring 25 between the diffuser and the casing 7 adjacent the sealing ring 16. The compressor housing 4 is shown sealed by an O-ring 26 to the casing 7 and is also bolted thereto by studs (not shown) which extend into the casing 7 through the outer rim 27 of the compressor housing. The turbine housing 1 and the casing 7 are, in turn, secured together as by studs 28 extending through the casing 7 and into the thickened wall portion 29 of the housing 1.

The casing 7 is centrally bored at 30 to receive a cylindrical bearing carrier sleeve 31 with a slip fit, and flanged bearing sleeves 32 and 33 are pressed into the opposite ends of this sleeve 31 to journal the shaft 8. Lubricating and cooling oil for the shaft bearings 32 is conducted through suitable cored passageways (not shown) to radial ports 35 and 36 in the carrier sleeve 31. Such oil is returned from the bearings via other radial ports 37 in the carrier sleeve to an annular chamber 38 in the casing 7, and from this via a cored oil outlet passage 39. O-ring seals 34 in the casing 30 serve to prevent oil leakage between it and the carrier sleeve 30 in either axial direction from the port 35, and in the direction toward the oil chamber 38 from the carrier port 36.

Figure 2:
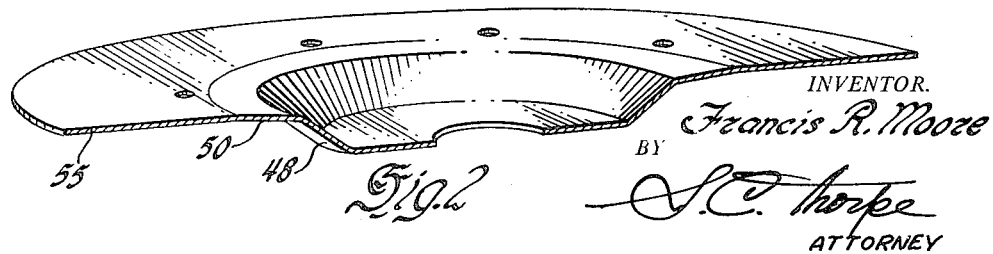
Figure 2 is a perspective view of the turbine radiation shield and nozzle spring, shown removed from the turbocharger and broken away along its diametral section.

Encircling the turbine rotor at the entrance to its blades 10 is a nozzle ring 40 which is piloted for axial slidable movement on a radially inward facing surface 41 of the turbine housing. The vanes 42 of this nozzle ring abut the turbine housing surface 43, and oppositely thereof the nozzle ring is provided with a plurality of circumferentially spaced projecting bosses, only one of which is shown at 44. It will be noted that the compressor side of the turbine rotor 9, the radially inner facing surface of the nozzle ring 40 and the turbine facing surface of the casing 7 cooperate in defining a chamber 45 through which cooling air may be circulated to minimize heat radiation from the turbine to the shaft bearings and the compressor generally. For introducing such cooling air, as from the engine intake manifold or air box (not shown), the casing 7 is provided with connecting radially and axially drilled passages 46 and 47, respectively. A small clearance indicated at 53 between the periphery of the turbine rotor and the nozzle ring 40 serves as an exit passageway from this cooling air chamber into the turbine housing chamber via the nozzle vanes 42. In order that cooling air flowing through the chamber 45 may be directed to pass in close proximity to the rotor heat dam section 12 and thence radially along the compressor side of the turbine rotor, there is provided an annular plate-like baffle or shield 48 (best shown in Figure 2). This shield thus serves to block or reduce radiation of heat from the turbine to the shaft bearing 32, as well as to the casing 7 and compressor housing 4, and this function is of course materially augmented by the cooling air flow around the shield between its central opening 49 and the rotor hub.

While such shielding of radiated heat from the turbine has heretofore been proposed by others, I have combined this function of the shield with that of resiliently biasing the turbine nozzle 40 so as to take up all axial movement of the nozzle ring relative to the turbine housing, and have also made the shield sufficiently large in radial extent that its outer annular portion 55 serves to block heat radiation from the turbine housing and compressor outwardly of the nozzle ring. Thus, a one piece shield 48, made of resilient material such as spring steel, is provided in the manner of a Belleville spring in which the portion 50 radially inwardly adjacent the section thereof which is clamped between the opposing faces 51 and 52 of the turbine housing 1 and casing 7, respectively, has a slight degree of dish from the plane normal to the axis of the shield. This portion 50 engages the bosses 44 of the nozzle ring when the turbine housing and casing are clamped together and acts to bias the nozzle against its abutment surface 43 on the turbine housing. 56 and 57 indicate shimming washers which may be selected in thickness and inserted on opposite sides of the shield to obtain the proper axial location of the turbine rotor relative to its housing 1 and nozzle ring 40.

By using shield 48 in the manner described for clamping the nozzle ring I obtain several advantages: Neither the tolerance stack-up between the various parts nor the shimming of the turbine housing affects the clamping. The clamping action is also unaffected by relative expansion of the parts, even at high operating temperatures. Thus, the nozzle ring is always held firmly in place.

While only a single preferred embodiment of the inventoin has been disclosed, it is appreciated that numerous minor changes in the construction and arrangement of the parts may be made without departing from the spirit and scope of the invention as defined in the following claims.

I claim:

1. In an engine exhaust gas driven turbine, a turbine rotor, a housing having an inlet for exhaust gases flowing to the turbine rotor, a turbine entrance nozzle slidably mounted on the housing, said housing having an abutment surface limiting slidable movement of the nozzle in one direction, journaling means for the turbine rotor, and a spring member secured to the housing and biasing said nozzle against said abutment surface, said spring member being yieldable to accommodate thermal expansion of the nozzle relative to the housing and including a plate-like baffle extending intermediate the turbine rotor and its said journaling means to shield said journaling means from heat radiated by the turbine rotor during operation.

2. In an engine exhaust gas driven turbine, a turbine rotor, a housing having an inlet for exhaust gases flowing to the rotor, a rotor entrance nozzle movably mounted on the housing, said housing having an abutment limiting movement of the nozzle in one direction, supporting means for the rotor including a rotor shaft, a bearing journaling the shaft at a distance axially thereof from the rotor, and a bearing support cooperating with the rotor and nozzle in defining a cooling air chamber about the shaft intermediate the rotor and said bearing, an annular plate-like member axially partitioning said chamber and having a central opening accommodating cooling air flow through the member only in close proximity to the shaft, said member having a resilient radially outward extending portion engaging and biasing the nozzle against said abutment, and passage means for conducting cooling air into said chamber on the support side of said member, said nozzle and rotor defining an outlet passage therebetween for cooling air leaving the chamber on the rotor side of said member.

3. In an exhaust turbocharger, a turbine rotor, a compressor driven by said rotor including a compressor housing, a turbine housing, a nozzle opposite the entrance to the rotor, a mounting surface on the turbine housing for the nozzle relative to which the nozzle may move in response to thermal expansion, a rotor shaft, a bearing for said shaft mediate the rotor and the compressor, and a heat deflecting annular shield clamped between said housings and extending generally radially toward the shaft, said shield being of resilient material and having its radially inward extremities terminating between the rotor and said bearing, said nozzle engaging the shield and biased thereby against said mounting surface.

4. In an exhaust turbocharger having a turbine housing and an axially spaced compressor housing, turbine and compressor rotors in said housings, a common shaft coupling said rotors, a bearing and a supporting casing therefor interconnecting said housings, said turbine housing having adjacent annular surfaces facing the shaft and said casing, respectively, a nozzle ring slidably fitting said shaft facing surface and abutting said casing facing surface, said casing and turbine housing having coacting clamping faces located radially outward of said nozzle ring, and a Belleville spirng plate clamped between said clamping faces and extending generally radially inward and outward therefrom to shield the compressor and said bearing from turbine heat radiation, said plate having its radially inward extending portion engaging and clamping the nozzle ring against said last named surface.

5. The invention of claim 4, wherein said plate cooperates with said casing, shaft and turbine rotor in defining axially spaced annular cooling air chambers with communication therebetween at their inner extremities, and wherein said nozzle ring and turbine rotor define an outlet from said chamber nearest the rotor, said casing having a passage for introducing cooling air into the other of said chambers.

References Cited in the file of this patent
UNITED STATES PATENTS

| 2,492,672 | Wood | Dec. 27, 1949 |
| 2,578,785 | Davis | Dec. 18, 1951 |
| 2,709,567 | Wood | May 31, 1955 |
| 2,775,400 | Cox | Dec. 25, 1956 |

FOREIGN PATENTS

| 663,693 | Great Britain | Dec. 27, 1951 |